No. 897,651. PATENTED SEPT. 1, 1908.
J. T. H. PAUL.
MECHANICAL MOVEMENT.
APPLICATION FILED JAN. 2, 1906.

6 SHEETS—SHEET 3.

Witnesses:
Chas. S. Gaylord,
John Enders.

Inventor:
John T. H. Paul,
By Dyrenforth, Dyrenforth & Lee,
Attys.

No. 897,651. PATENTED SEPT. 1, 1908.
J. T. H. PAUL.
MECHANICAL MOVEMENT.
APPLICATION FILED JAN. 2, 1906.
6 SHEETS—SHEET 4.
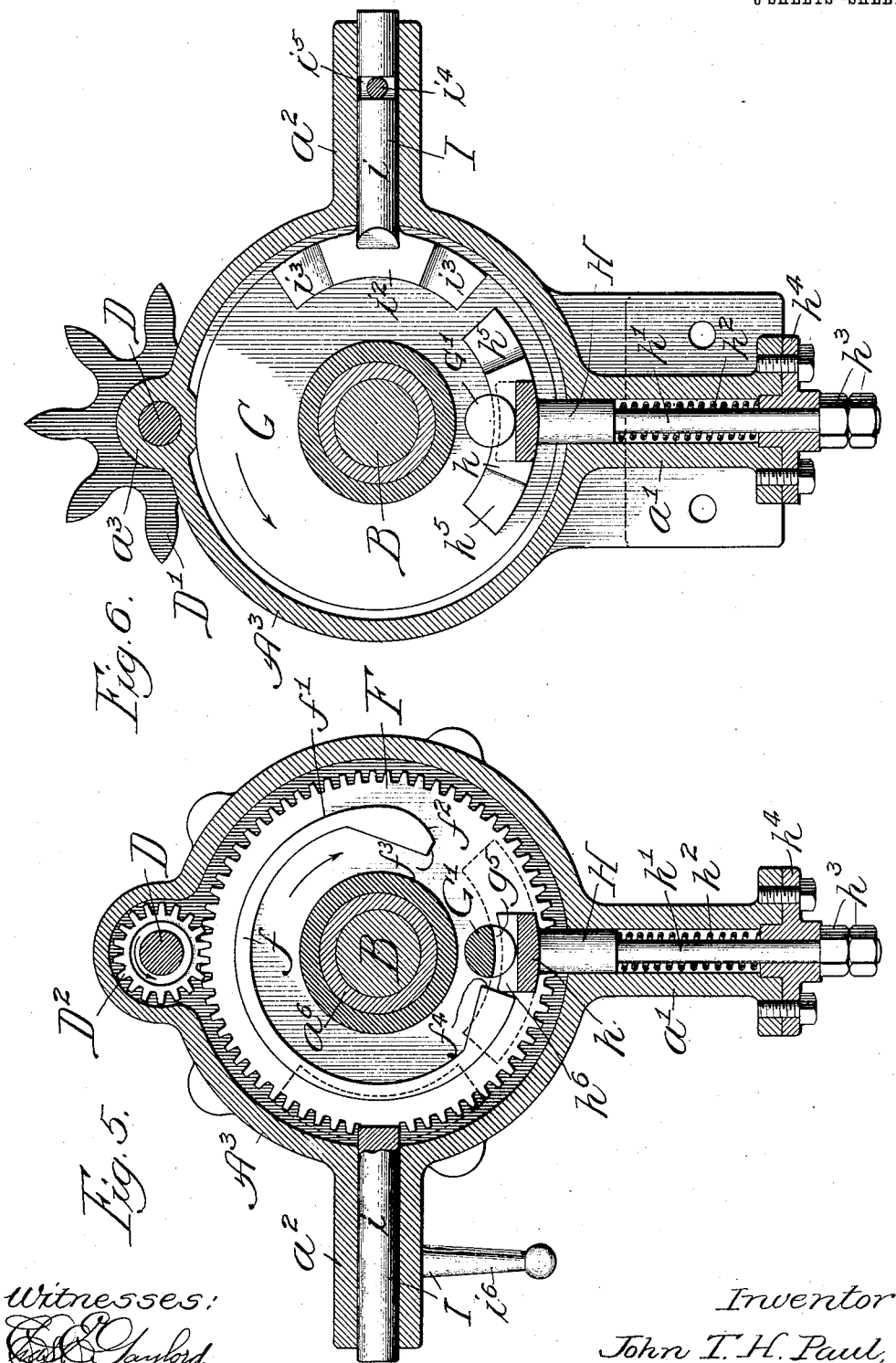
Witnesses:
Inventor:
John T. H. Paul,
By Dyrenforth, Dyrenforth & Lee,
Attys.

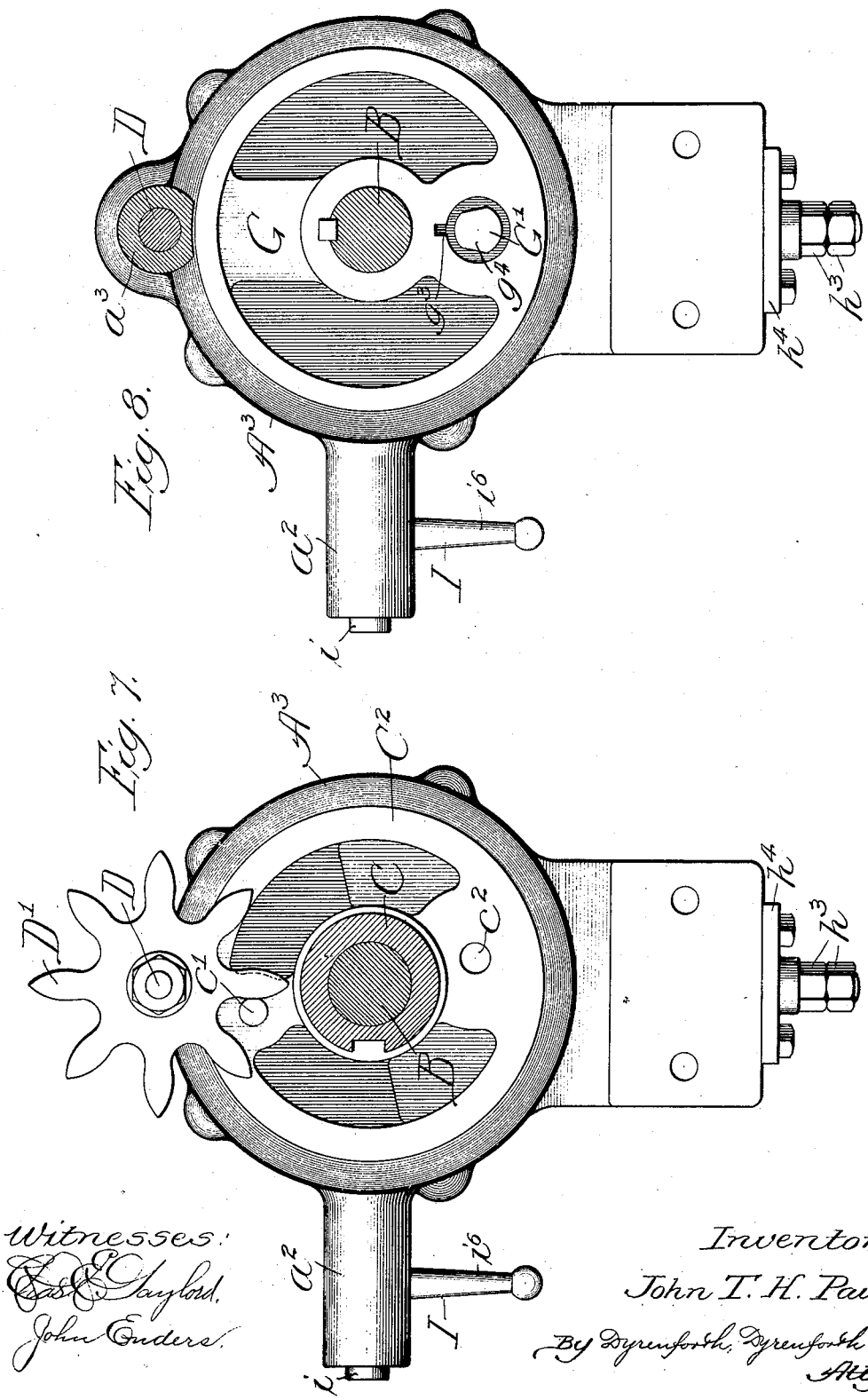

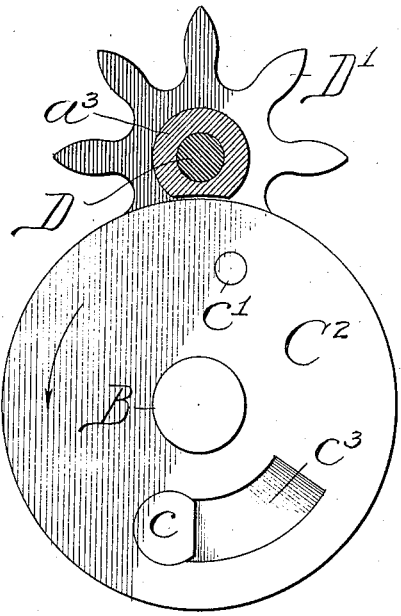
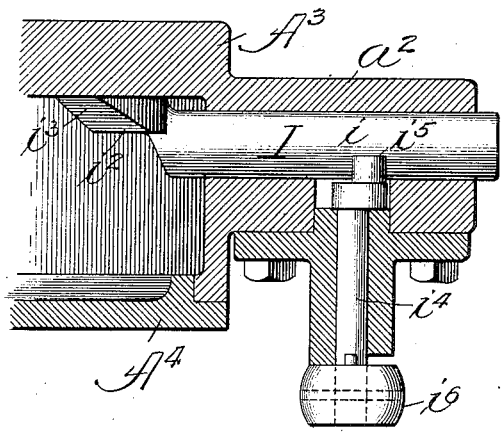
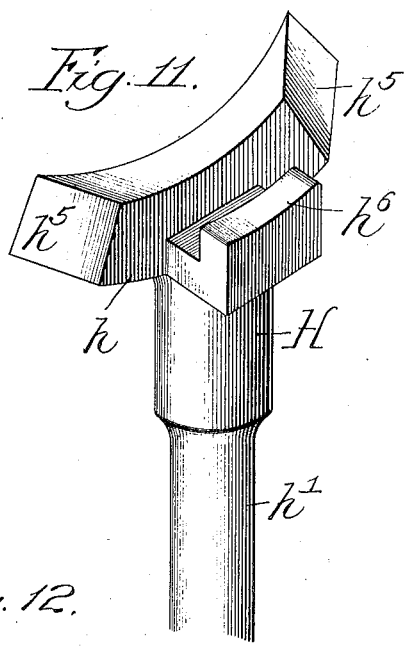
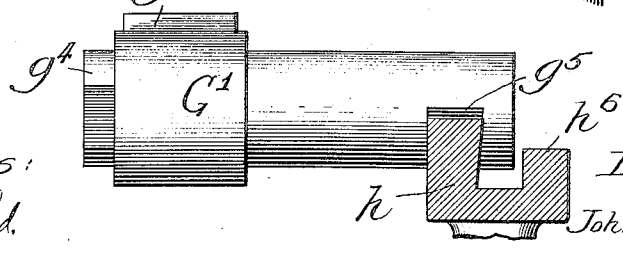

UNITED STATES PATENT OFFICE.

JOHN T. H. PAUL, OF CHICAGO, ILLINOIS, ASSIGNOR TO E. GOLDMAN & CO. INC., A CORPORATION OF ILLINOIS.

MECHANICAL MOVEMENT.

No. 897,651.  Specification of Letters Patent.  Patented Sept. 1, 1908.

Application filed January 2, 1906. Serial No. 294,104.

*To all whom it may concern:*

Be it known that I, JOHN T. H. PAUL, a citizen of the United States, residing at Chicago, in the county of Cook and State of Illinois, have invented a new and useful Improvement in Mechanical Movements, of which the following is a specification.

My invention relates particularly to means for producing, from continuous rotary motion, an intermittent rotary motion; and my primary object is to provide mechanism of simple, compact and durable construction for converting continuous rotary motion into intermittent rotary motion. The improved mechanism is adapted to various purposes, among which may be mentioned the peration of bottle-washing and sterilizing machines, in which an intermittent motion of the bottle carrier or belt is required.

The invention is shown in its preferred embodiment in the accompanying drawings, in which—

Figure 1:
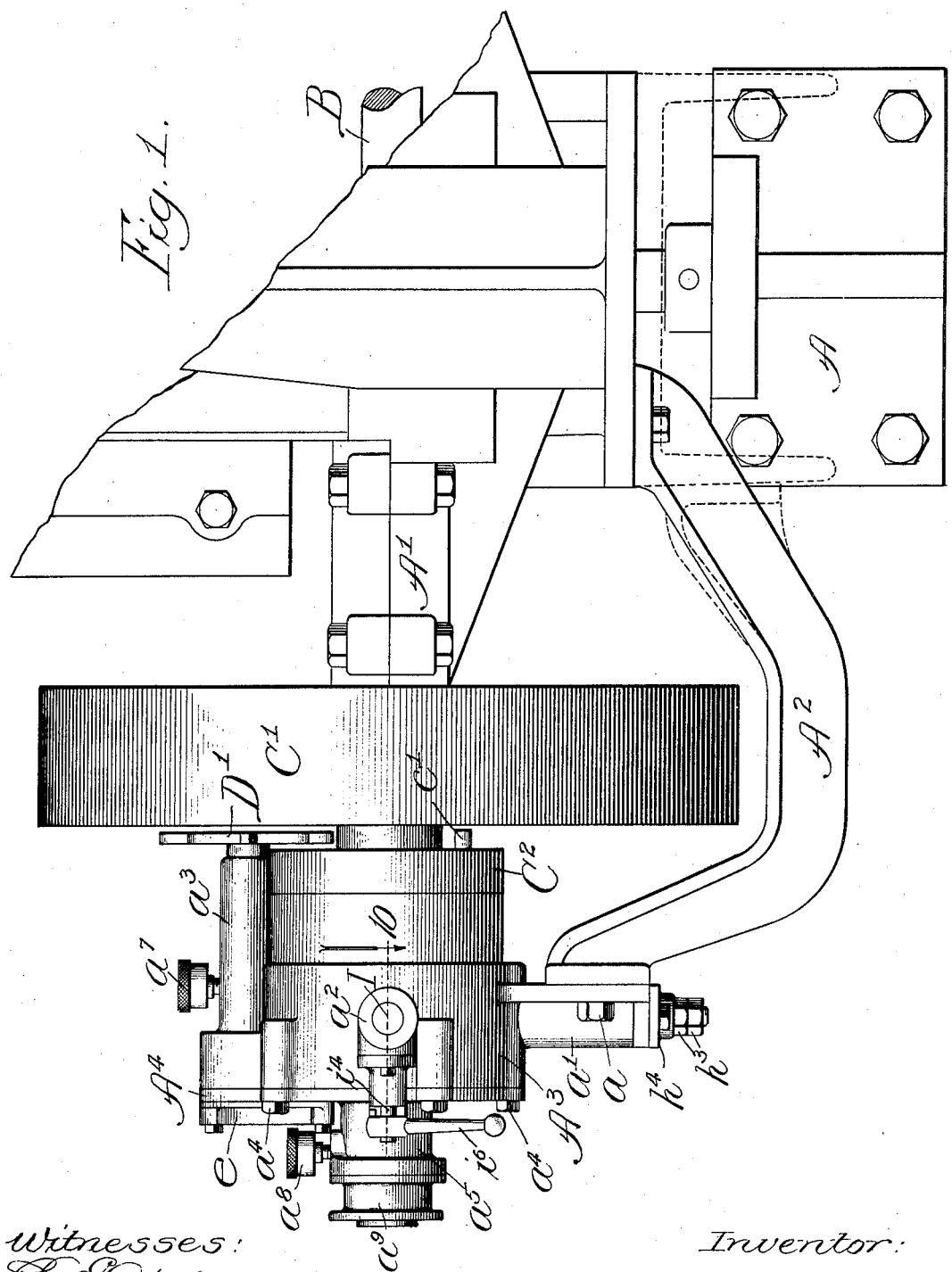
Figure 2:
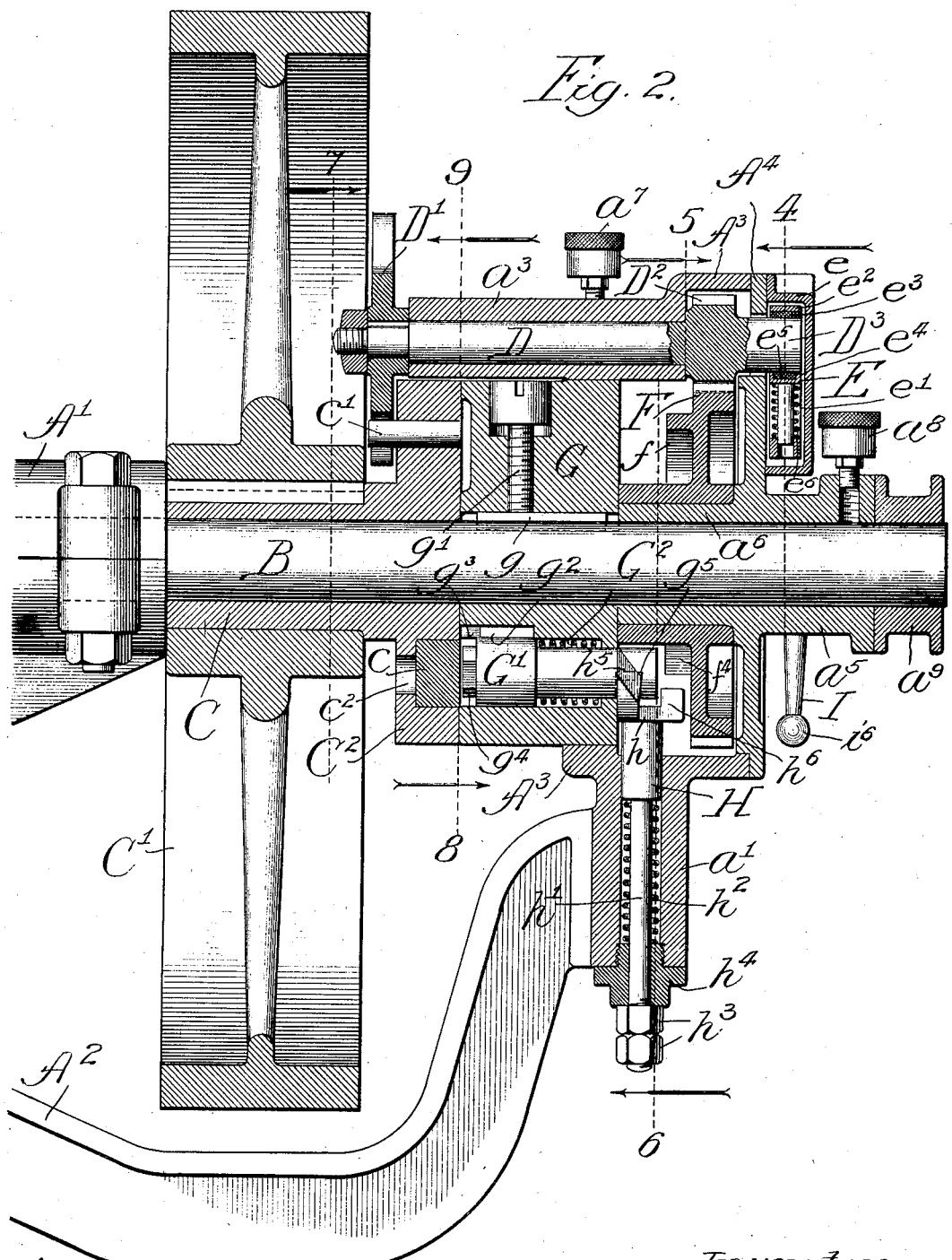
Figure 3:
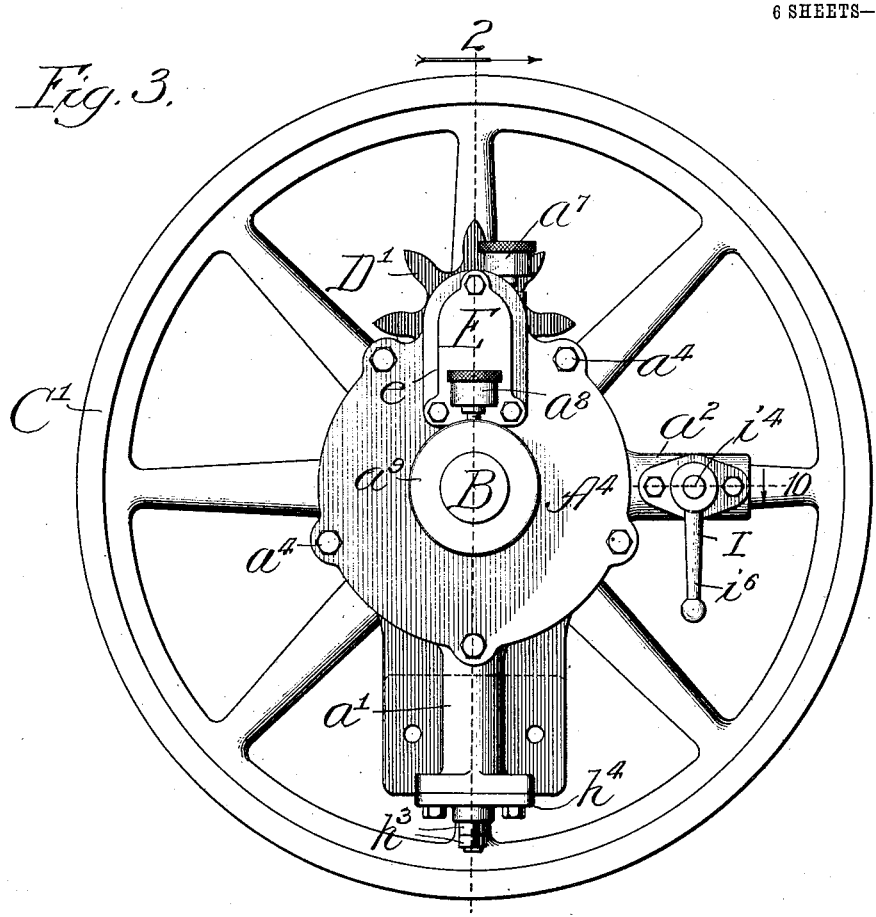
Figure 4:
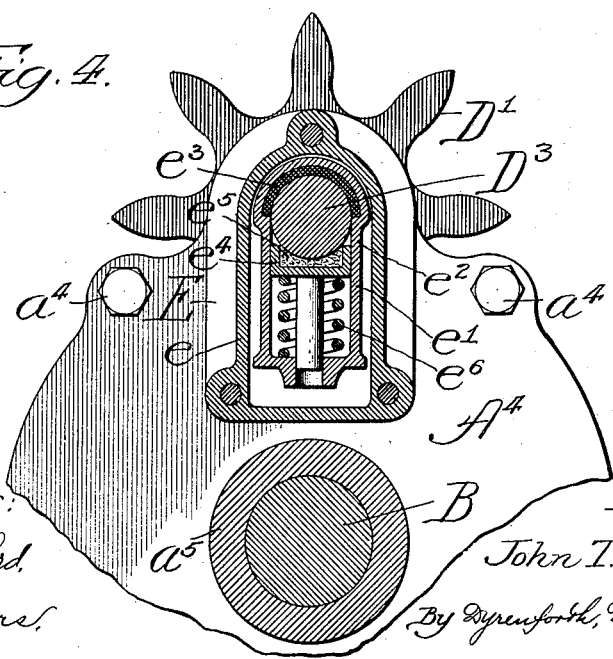

Figure 1 represents an elevational view of my improved mechanism and a fragmentary view of a frame upon which it is mounted; Fig. 2, a vertical sectional view of the same taken as indicated at line 2 of Fig. 3; Fig. 3, an end elevational view of the mechanism shown in Fig. 1; Fig. 4, a broken section taken as indicated at line 4 of Fig. 2 and showing a detail of a brake employed; Fig. 5, a section taken as indicated at line 5 of Fig. 2; Fig. 6, a section taken as indicated at line 6 of Fig. 2; Fig. 7, a section taken as indicated at line 7 of Fig. 2; Fig. 8, a section taken as indicated at line 8 of Fig. 2; Fig. 9, a section taken as indicated at line 9 of Fig. 2; Fig. 10, a broken section taken as indicated at line 10 of Figs. 1 and 3; Fig. 11, a perspective view of a clutch-member retractor employed; and Fig. 12, an elevational view of the clutch-member with the retractor shown sectionally in engagement therewith.

In the construction shown, A represents a portion of a frame provided with a shaft-bearing $A^1$ and equipped with a bracket-arm $A^2$; $A^3$, an annular casing rigidly connected by means of bolts $a$ with the bracket-arm $A^2$, and equipped at its lower portion with an extension $a^1$ for receiving an automatically acting clutch member retractor equipped at its front side with an extension $a^2$ for receiving a manually-operated clutch-member retractor and equipped at its upper portion with a rearwardly or inwardly extending bearing $a^3$ for receiving an intermittently actuated shaft; $A^4$, a casing-plate rigidly connected by means of bolts $a^4$ with the outer end of the casing $A^3$, said plate being provided centrally with a hub $a^5$ affording a bearing in alinement with the bearing $A^1$; B, a driven shaft, which may constitute as well a driving shaft of any machine to which the improved mechanism may be applied; C, a sleeve journaled on the shaft B and equipped with an actuating pulley $C^1$ rigidly secured on the sleeve, said sleeve being provided near the outer face of the pulley with a disk or wheel $C^2$ equipped with a clutch-member $c$ and with a wheel-actuating stud $c^1$; D, a shaft journaled in the bearing $a^3$ and equipped with a wheel $D^1$ having teeth projecting into the path of the stud $c^1$, said shaft being further equipped with a pinion $D^2$ and in front of said pinion with an extension $D^3$; E, a brake, or friction device, acting on the extension $D^3$ of the shaft D; F, a gear meshing with the pinion $D^2$ and journaled on an inward extension $a^6$ of the stationary hub, or bearing, $a^5$, said gear being equipped on its inner side with a cam $f$ serving to retract the automatically actuated clutch-member retractor; G, a wheel, or disk, rigidly secured on the shaft B, as by means of a key $g$ and a set screw $g^1$; $G^1$, a clutch-member longitudinally movable in a transverse bearing with which the disk G is provided, the member $G^1$ having a key $g^2$ working in a slot $g^3$ with which the member G is provided; $G^2$, a spring tending to force the clutch-member G into operative engagement with the clutch-member $c$ of the member $C^2$; H, an automatically operated clutch-member retractor; and I, a manually-operated clutch-member retractor.

The frame construction may be of any suitable form. It is convenient to support the casing $A^3$ at a distance from the plane of the bearing $A^1$, secure the casing-plate $A^4$ thereto, and mount the operative mechanism between the shaft bearings thus afforded. The arrangement preferably is such that the outer end of the disk G projects somewhat into the inner end of the casing $A^3$. I have shown oil cups $a^7$, $a^8$ connected with the bearings $a^3$, $a^5$; and have provided a collar $a^9$ on the end of the shaft B outside the bearing $a^5$. In the arrangement shown, it is expected that the intermittent motion which the shaft B receives will be utilized by making connection between that portion of the shaft which is shown broken in Fig. 1 and the operative portion of any machine to which my improved mechanism may be applied.

The shaft B may, of course, be extended at either end to enable the power to be taken therefrom.

In the section shown in Fig. 7, the pulley is not shown in connection with the sleeve C, and this view, taken in connection with Fig. 2, serves to show clearly the relation of the stud $c^1$ with the wheel $D^1$ which it actuates. The disk $C^2$, which is formed integrally with the sleeve C, has its clutch-member $c$ formed of hardened steel inserted in a socket provided on the rear face of the disk, as shown in Fig. 9. A perforation $c^2$ appearing in Figs. 2 and 7, enables a tool to be inserted for use in removing the member $c$. As shown in Fig. 9, the rear face of the disk $C^2$ is provided with a beveled recess $c^3$ in which the end of the clutch-member $G^1$ moves, when the retractor of said member is withdrawn, allowing the spring $G^2$ to force the member $G^1$ into engagement with the member $c$.

As appears from Fig. 2, the shaft D and the pinion $D^2$ are in integral formation, and the wheel $D^1$ is located between the planes of the disk $C^2$ and the pulley $C^1$. This is of importance only in securing a compact arrangement of the mechanism.

The brake E comprises a casing $e$ applied to the upper portion of the face-plate $A^4$, and containing a friction device $e^1$ engaging the projection $D^3$ of the shaft D. The details of construction of the friction device are unimportant, but it may be mentioned that I preferably employ a member $e^2$ embracing the shaft and provided with friction material $e^3$ engaging the shaft, and a follower $e^4$ provided with friction material $e^5$ and equipped with a spring $e^6$. The function of the brake is to prevent the shaft D from moving under its own inertia, thereby insuring the same amount of movement of the shaft each time the wheel $D^1$ is actuated by the stud $c^1$.

The construction of the wheel F and the cam $f$ carried thereby will be understood from Figs. 2 and 5. The cam has an exterior surface $f^1$ struck on the arc of a circle concentric with the shaft B, and at one end the surface $f^1$ is joined by a surface $f^2$ of varying radius, which serves to depress the clutch-member retractor H. The cam is cut away between the points $f^3$, $f^4$, so that when the space between the ends of the cam is encountered, the retractor H can return to the position which it occupies in withdrawing the clutch-member $G^1$.

The construction of the clutch-member $G^1$ will be understood readily. It is provided at its inner end with a projection $g^4$ adapted to enter the recess $c^3$ of the disk $C^2$ and engage the clutch-member $c$. At its outer end, it is provided with a slot $g^5$ so located that it will be engaged by the member H when the latter is free from the cam $f$, that is in the non-retracted position of the member H.

The retractor H comprises a plunger having a head $h$ at its inner end and an outwardly projecting stem $h^1$ encircled by a spring $h^2$ contained within the housing $a^1$. The outer end of the stem $h^1$ is equipped with nuts $h^3$ limiting the inward movement of the member. As shown, the housing, or extension, $a^1$ is equipped with a removable cap $h^4$ through which the stem $h^1$ extends. The head $h$ of the member H comprises a segment equipped at its ends with beveled surfaces $h^5$, one of which (according to direction of rotation of the member G) is adapted to engage the outer wall of the slot $g^5$ with which the clutch-member $G^1$ is provided, and thus retract the clutch-member. Adjacent to the segment-like head is located a cam $h^6$ located in the path of the cam $f$, whereby the member H will be depressed, or retracted, at each revolution of the wheel F, and held retracted during a predetermined portion of the revolution of the wheel. Obviously, the period of retraction may be varied by varying the cam $f$.

The operation of the retractor H is wholly automatic. However, there may be times when it is desired to stop the operation of the machine very quickly, and provision is made for this in the manually-actuated clutch-retractor I. This device comprises a normally retracted member $i$ mounted in the casing-extension $a^2$ and equipped with a segmental head $i^2$ having beveled surfaces $i^3$ at its ends, one of which (according to direction of rotation of the member G) will serve, when the member $i$ is forced inwardly, to engage the slot of the clutch-member $G^1$ and retract the clutch-member. The member $i$ is actuated by a crank-shaft $i^4$, the crank of which works in a slot $i^5$ with which the member $i$ is provided, as shown in Fig. 6. The outer end of the shaft $i^4$ is equipped with a lever $i^6$. It is obvious that by means of this device, the clutch-member $G^1$ may be retracted at the will of the operator, and maintained in its retracted position as long as desired.

The operation may be briefly summarized: Power is applied to the pulley $C^1$, and the disk $C^2$ thereby caused to revolve continuously. At each revolution of the disk, the stud $c^1$ encounters the star-wheel $D^1$, thereby turning the shaft D a portion of a revolution. From the shaft D motion is transmitted to the gear F, thereby actuating the cam $f$. When the cam $f$ encounters the cam $h^6$ carried by the member H, the member H is depressed, thereby releasing the clutch-member $G^1$ and enabling the spring thereof to force the clutch-member into engagement with the clutch-member $c$ carried by the disk $C^2$. Thus, the disk G will be coupled directly to the disk $C^2$ and will rotate with the pulley. The disk G will continue to rotate with the pulley until the star-wheel D¹ has been actuated a sufficient number of times to turn the gear F to such position as to free the member H from engagement with the cam f, when the member H will rise, under the action of its spring, thereby bringing the sector h into the path of the slot g⁵ of the clutch-member G¹, which will result in the retraction of said clutch-member, and the disconnection of the disk C². As the disk C² continues to rotate with the pulley, the intermittent actuation of the gear F will continue until the cam f again encounters the cam h⁶ of the member H, causing the same to be depressed and the clutch-member G¹ to be again released to enable it to effect a coupling between the disk G and the disk C². Thus it will be observed that the clutch-member G¹ will be automatically caused to engage the companion clutch-member of the disk C² from time to time and release the same, so long as the rotation of the pulley C¹ continues, it being assumed, of course, that the manually-operated clutch-member retractor I is held in the retracted position shown in Fig. 6. When it is desired to retain the clutch-member G¹ in its retracted position, the lever i⁶ may be actuated to thrust the clutch-member retractor i inwardly, which will result in the retraction of said clutch-member and the permanent retention thereof in the retracted position.

The construction herein shown and described is of an exceedingly compact and durable nature, and is given as the preferred construction; also, the detailed description herein given is for clearness of understanding only. The shaft D need not necessarily have an intermittent motion.

It is obvious that the mechanism may be caused to operate in either direction of rotation of the pulley by making suitable provision at the clutch-member with which the disk C² is equipped and changing the cam f. For this purpose, interchangeable disks and cams may be provided for use in the same mechanism, if desired.

What I regard as new, and desire to secure by Letters Patent, is—

1. In mechanism of the character set forth, the combination of a rotary member, a member in axial alinement therewith and adapted to be connected to rotate therewith, a rotary cam in axial alinement with said first and second-named members, a clutch-member carried by the second-named member and controlled by said cam, a clutch-member carried by the first-named member and adapted to be engaged by the first-named clutch-member, and actuating means for said cam actuated from said first-named member, for the purpose set forth.

2. In mechanism of the character set forth, the combination of a rotary member, a member in axial alinement therewith and adapted to be connected to rotate therewith, a clutch-member carried by said second-named member, a spring tending to project said clutch-member, a rotary cam in axial alinement with said first and second-named members and controlling said clutch member, and intermittent actuating means for said cam actuated by said first-named member, for the purpose set forth.

3. In mechanism of the character described, the combination of a shaft, a rotary member journaled thereon, a member secured on the shaft and adapted to be connected to rotate with said rotary member, a spring-projected clutch-member carried by the second-named member journaled on said shaft, a rotary cam in coaxial alinement with said shaft, and means for moving said cam, said means being actuated by said rotary member, for the purpose set forth.

4. In mechanism of the character set forth, the combination of a shaft, a rotary member journaled thereon, a member firmly secured on the shaft and adapted for connection with said rotary member, a clutch-member carried by said firmly secured member, a rotary cam coaxial with said shaft, a second shaft geared to said cam and equipped with a wheel located adjacent to said rotary member, and means connected with the rotary member for actuating said wheel for the purpose set forth.

5. In mechanism of the character described, the combination of a shaft, a sleeve journaled thereon and equipped with a firmly secured pulley and a disk adjacent to said pulley, a clutch-member carried by said disk, a disk secured to the shaft adjacent to said first-named disk, a cam journaled concentric with said shaft adjacent to said second-named disk, a clutch-member carried by the second-named disk and controlled by said cam, a shaft parallel with said first-named shaft and geared to said cam, a wheel connected with said second-named shaft, and a stud moving with said pulley and first-named disk and serving to actuate said wheel, for the purpose set forth.

6. In mechanism of the character set forth, the combination of a shaft, bearings for said shaft, a sleeve journaled on said shaft adjacent to one bearing and provided with a fixedly secured pulley and adjacent to the pulley with a disk, a stud carried by said disk, a disk secured on said shaft adjacent to said first-named disk, a clutch-member carried by the second-named disk, a rotary cam journaled adjacent to the other shaft bearing and controlling said clutch member, a second shaft parallel with the first-named shaft and geared to said cam, and a wheel secured on said second-named shaft between said pulley and said first-named disk, for the purpose set forth.

7. In mechanism of the character set forth, the combination of a frame provided with a shaft-bearing, a bracket projecting from the frame and equipped with a casing and a shaft-bearing, a shaft journaled in said bearings, a sleeve journaled on said shaft adjacent to said first-named bearing and equipped with a pulley and disk, a disk firmly secured on said shaft adjacent to said first-named disk and equipped with a movable clutch-member, a cam journaled on an inward extension of said second-named bearing and controlling said clutch-member, a second shaft geared to said cam and equipped with a wheel located between the planes of the pulley and the first-named disk, and a stud carried by the first-named disk serving to actuate said wheel, for the purpose set forth.

8. In mechanism of the character set forth, the combination of a rotary member, a member adapted to be connected to rotate therewith, a clutch-member carried by the second-named member, a clutch-member retractor automatically controlled from the first-named member, and a manually-controlled clutch-member retractor, for the purpose set forth.

9. In mechanism of the character set forth, the combination of a shaft, a rotary member journaled thereon, a member fixedly secured to the shaft and equipped with a clutch-member, a reciprocable clutch-member retractor, a cam controlling said retractor and actuated from said rotary member, and a normally retracted manually-operated clutch-member retractor, for the purpose set forth.

10. In mechanism of the character set forth, the combination of a shaft, a sleeve journaled thereon equipped with a pulley and a disk, a disk secured on the shaft adjacent to said first-named disk, a clutch-member carried by said second-named disk and movable longitudinally of said shaft, a retractor movable at right angles to said clutch-member, means actuated from the pulley and controlling said retractor, and a second retractor at right angles to said clutch-member and equipped with manually-actuated means, for the purpose set forth.

11. In mechanism of the character set forth, the combination of a shaft, a rotary member journaled thereon, a member adjacent to said rotary member fixedly secured on the shaft, a clutch-member carried by said fixedly secured member, a cam controlling said clutch-member, a second shaft geared to said cam and intermittently actuated from said rotary member, and a brake connected with said second-named shaft, for the purpose set forth.

12. In mechanism of the character described, the combination of a frame equipped with a shaft-bearing, a bracket supported on said frame, a casing and shaft-bearing carried by said bracket, a shaft journaled in said bearings, a rotary member journaled on said shaft adjacent to said first-named bearing, a member fixedly secured on said shaft adjacent to said rotary member and extending into said casing, a shaft-bearing carried by said casing, a second shaft parallel with the first shaft, a rotary cam concentric with the first-named shaft and geared to the second-named shaft, a clutch-member carried by the member fixedly secured on said shaft and controlled by said cam, and means connected with said rotary member and said second-named shaft for actuating the second-named shaft and through the medium thereof said cam, for the purpose set forth.

JOHN T. H. PAUL.

In presence of—
A. U. THORIEN,
J. H. LANDES.